US012221134B1

(12) United States Patent
Pronovost

(10) Patent No.: US 12,221,134 B1
(45) Date of Patent: Feb. 11, 2025

(54) DETERMINING PREDICTIONS USING AN ENCODER-DECODER MACHINE LEARNING ARCHITECTURE

(71) Applicant: Zoox, Inc., Foster City, CA (US)

(72) Inventor: Ethan Miller Pronovost, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 238 days.

(21) Appl. No.: 18/148,049

(22) Filed: Dec. 29, 2022

(51) Int. Cl.
*B60W 60/00* (2020.01)
*B60W 40/02* (2006.01)
*G06V 20/58* (2022.01)

(52) U.S. Cl.
CPC ........ *B60W 60/0027* (2020.02); *B60W 40/02* (2013.01); *G06V 20/58* (2022.01); *B60W 2554/4041* (2020.02)

(58) Field of Classification Search
CPC ............. B60W 60/0027; B60W 40/02; B60W 2554/4041; G06V 20/58

USPC .......................................................... 701/23
See application file for complete search history.

(56) References Cited

U.S. PATENT DOCUMENTS

| 11,858,536 | B1* | 1/2024 | Liu ..................... G06N 3/0464 |
| 2019/0152490 | A1* | 5/2019 | Lan ................... B60W 30/0956 |
| 2020/0159225 | A1* | 5/2020 | Zeng ..................... G05D 1/0088 |
| 2021/0149404 | A1* | 5/2021 | Zeng ....................... G01S 17/89 |
| 2021/0278852 | A1* | 9/2021 | Urtasun .................. G06T 17/05 |
| 2022/0153298 | A1* | 5/2022 | Wang ..................... G06N 3/126 |
| 2022/0157161 | A1* | 5/2022 | Tan ..................... G06F 18/2415 |

* cited by examiner

*Primary Examiner* — Muhammad Shafi
(74) *Attorney, Agent, or Firm* — Lee & Hayes, P.C.

(57) ABSTRACT

Techniques for generating a prediction about a vehicle environment and for controlling the vehicle based on the prediction are described herein. In some cases, a prediction about a vehicle environment can be determined based on at least one of contextual data associated with the vehicle environment, object state data associated with an object (e.g., another vehicle) in the vehicle environment, or image data associated with the object.

18 Claims, 6 Drawing Sheets

DETERMINING PREDICTIONS USING AN ENCODER-DECODER MACHINE LEARNING ARCHITECTURE

BACKGROUND

Various methods, apparatuses, and systems are utilized by autonomous vehicles to guide such autonomous vehicles through environments including various static and dynamic objects. For instance, autonomous vehicles utilize route planning methods, apparatuses, and systems to guide autonomous vehicles through congested areas with other moving vehicles (autonomous or otherwise), moving people, stationary buildings, etc. In some examples, an autonomous vehicle may make decisions while traversing an environment to ensure safety for passengers and surrounding persons and objects. A variety of sensors may be used to collect information about objects in the surrounding environment, which may be used by the autonomous vehicle to make decisions on how to traverse the environment. Accurately predicting object behavior in the environment may, at times, present challenges.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
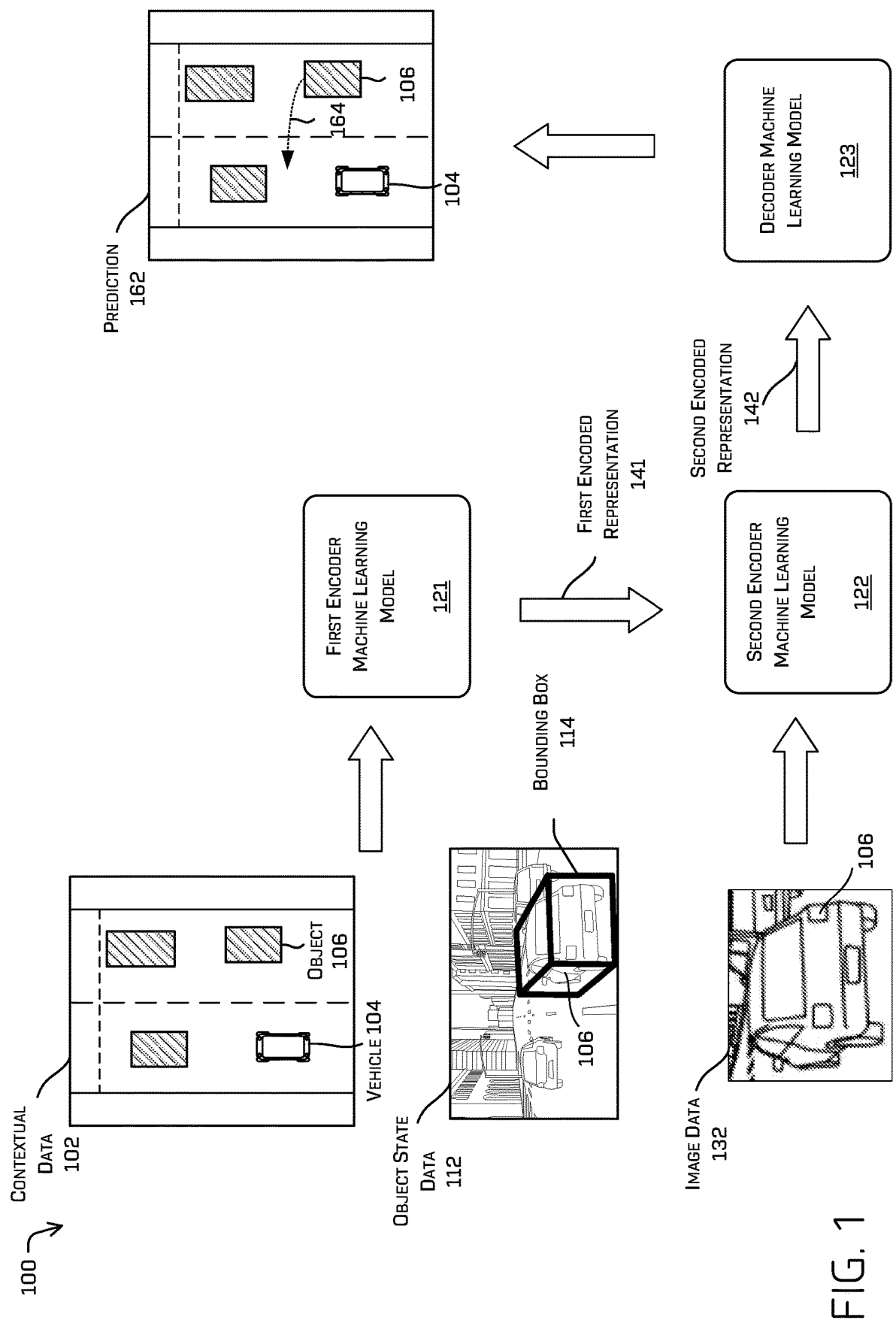
FIG. 1 illustrates an example architecture for determining a prediction about a vehicle environment using a set of machine learning models.

Techniques for generating a prediction about a vehicle environment and for controlling the vehicle based on the prediction are described herein. In some cases, a prediction about a vehicle environment can be determined based on at least one of contextual data associated with the vehicle environment, object state data associated with an object (e.g., another vehicle) in the vehicle environment, or image data associated with the object. In some of such cases, determining the prediction includes processing the contextual data and the object state data using a first encoder machine learning model to determine a first encoded representation, processing the first encoded representation and the image data using a second encoder machine learning model to determine a second encoded representation, and processing the second encoded representation using a decoder machine learning model to determine the prediction. The prediction (e.g., a prediction about a future trajectory of the object) can be used to generate and refine the vehicle's trajectory as the vehicle proceeds through the vehicle environment. Some examples of generating and/or refining the vehicle's trajectory may include determining a speed and/or steering controls to control the vehicle to proceed through the vehicle environment, determining when and/or how fast to stop the vehicle, determining a lane for the vehicle to use to proceed through the vehicle environment, and/or the like.

Many existing prediction systems that are configured to generate predictions about a vehicle environment, such as many predictions that rely on bounding box (or other object) feature data, may fail to integrate some features associated with the objects in the environment that are determined based on the image data associated with the environment, such as features that are not captured by contextual data associated with the environment and/or by object state data associated with the environment. Examples of such image-based object features include a feature representing that a bicyclist is beginning to lean before turning, a feature representing that the wheels of a vehicle are turning, a feature representing that a vehicle light is blinking before turning, and/or the like. The use of such image-based object features may improve predictive accuracy of the described prediction systems using the techniques disclosed herein. However, such image-based object features may not always be available. For example, in some cases, some object features for an object in an environment may not be available when the object is not sufficiently visible in image data of the environment. In some cases, a machine learning framework can be trained that enables generating a prediction using image-based object features when those image-based object features are available as well as generating a prediction without using the image-based object features when those image-based object features are not available. For example, when an image-based object feature for an object is available, an encoded representation generated based on the image-based object feature may be combined with another encoded representation of the relevant environment to generate a prediction. However, when the image-based object feature is not available, the prediction may be generated based on the latter encoded representation alone and without using the former encoded representation that is generated based on the image-based object feature.

In some cases, the techniques described herein include determining a prediction about a vehicle environment using a machine learning framework that includes one or more encoder machine learning models and a decoder machine learning model. In some cases, a first encoder machine learning model is configured to process at least one of contextual data associated with the environment at a first time or object state data representing an object in the environment at the first time to determine a first encoded representation of the environment. In some cases, a second encoder machine learning model is configured to process at least one of image data representing the object at the first time and the first encoded representation to determine a second encoded representation of the environment. In some cases, the decoder machine learning model is configured to process at least one of the seconded encoded representation or the encoded representation of the contextual data to determine the prediction about the vehicle environment. The first time may be a prediction time, a time associated with capturing of sensor data from one or more sensors of the vehicle, and/or the like.

In some cases, the techniques described herein include determining a prediction about a vehicle environment based on at least one of contextual data associated with the environment at a first time, object state data representing an object in the environment at the first time, or image data representing the object at the first time. In some cases, the contextual data includes data representing relative positioning, at the first time, of one or more objects (e.g., at least one vehicle, at least one lane marking, at least one traffic light, and/or the like) that are detected within the vehicle environment. For example, the contextual data may represent relative positioning of a set of objects detected within the environment with respect to each other and/or with respect to the vehicle. In some cases, the contextual data represents relative distances between pairs of detected objects and/or relative distances between each detected object and the vehicle.

In some cases, the contextual data may include a top-down view of a vehicle environment that associates an object detected within the vehicle environment (e.g., each object detected based on the sensor data received from one or more sensors of the vehicle) with a segment of a two-dimensional space representing the vehicle environment. In some cases, the top-down representation of the vehicle environment associates: (i) each object detected within the environment with a segment of the two-dimensional space representing the environment, and (ii) the vehicle with a segment of the two-dimensional space representing the environment. In some cases, contextual data associated with the vehicle environment includes a vectorized representation of the vehicle environment. In some cases, the vectorized representation associates an object (e.g., each object) detected within the environment with one or more vectors that represent features associated with a relative location of the object in the environment.

In some cases, the object state data associated with the vehicle environment represent one or more features associated with an object detected in the environment at a first time. An object may represent any environment feature that is detected within the vehicle environment based on the sensor data captured by one or more sensors associated with the vehicle and/or based on map data associated with the vehicle environment. Examples of objects include other vehicles present in the vehicle environment, pedestrians present in the vehicle environment, roadway objects (e.g., traffic lights, signs, lane markings, lane reference features, and/or the like) present in the vehicle environment, and/or the like. In some cases, the object state data associated with an object represent at least one of a bounding box representing the object (e.g., a bounding box representing the object within an image of the vehicle environment), one or more points representing the object, one or more bounding contours representing the object, one or more point clouds representing the object, a detected velocity of the object, or a detected acceleration of the object. In some cases, the object state data associated with an object at a first time represent both features of the object at the first time and features of the object for one or more preceding times before the first time (e.g., one or more preceding times in a defined time sequence, such as a sequence of prediction times, a sequence of sensor data capture times, and/or the like). For example, the object state data associated with an object a first time may represent features of the object at the first time and features of object for any preceding times before the first time for up to N such preceding times. In some of those cases, N may be a hyperparameter of a machine learning framework that is configured to determine predictions about a vehicle environment based on the object state data. In some cases, the object state data associated with an object include one or more positions, orientations, velocities, and/or accelerations of the object over one or more timesteps (e.g., over N recent timesteps). For example, the object state data associated with an object may include one or more positions of the object over one or more timesteps (e.g., over N recent timesteps). In some cases, the object state data associated with an object represent at least one of a position of the object, an orientation of the object, or a size of the object.

In some cases, the image data representing an object at a first time represent an image representation of the object in the vehicle environment at the first time. In some cases, the image data is determined based on an image captured from the vehicle environment at an image capture time associated with the first time (e.g., at the first time, at an image capture time that is within a threshold temporal proximity to the first time, and/or the like). For example, the image data may represent an image crop of the environment image, where the image crop is predicted to depict the object. In some cases, the image data representing an object a first time represent image sensor metadata associated with one or more images used to determine the image data. For example, if the image data include a cropped portion of an image that is configured to depict an environment image, then the image may further include one or more metadata features associated with the image sensor used to capture the environment image, such as at least one of an image sensor type (e.g., camera type) of the image sensor, an image sensor angle (e.g., camera angle) of the image sensor when capturing the environment image, an image sensor resolution of the image sensor, an image sensor location of the image sensor when capturing the environment image, and/or the like. In some cases, the image data includes a first image crop of an image of the environment that is captured at a first time, and the first image crop depicts and/or includes the object. In some cases, inputs to the second encoder machine learning model further include a camera type of a camera that is used to capture at least a portion of the image data.

In some cases, the techniques described herein include training a machine learning framework including two encoder machine learning models and a decoder machine learning model using at least two sets of distinct training operations that can be performed at distinct times. For example, in some cases, a first encoder machine learning model is trained at a first training time by backpropagating a first loss measure determined based on first ground-truth data to the decoder machine learning model and the first encoder machine learning model, while a second encoder machine learning model is trained at a second training time by backpropagating a second loss measure determined based on second ground-truth data to the decoder machine learning model and the second encoder machine learning model. In some examples, the first ground-truth data and the second ground-truth data are the same, while in other examples they are different. In some examples, after training the first encoder machine learning model at the first training time, the weight associated with the first encoder machine learning model can be "frozen" or otherwise fixed such that they are not further modified by the second training operation at the second time. In some cases, the second encoder machine learning model is trained at a second training time by backpropagating a second loss measure determined based on second ground-truth data to the decoder machine learning model, the first encoder machine learning model, and the second encoder machine learning model (e.g., by backpropagating the second loss measure from the decoder machine learning model to the second encoder machine learning model and from the second encoder machine learning model to the first encoder machine learning model).

In some cases, the first encoder machine learning model is configured to process first input data (e.g., contextual data of a vehicle environment and/or object state data of an object in the vehicle environment) to determine a first encoded representation, the second encoder machine learning model is configured to process second input data (e.g., image data of the object) and the first encoded representation to determine a second encoded representation, and the decoder machine learning model is configured to process the second encoded representation to determine a prediction. In some of such cases, given a training data entry that associates the first input data for a vehicle environment with a ground-truth prediction for that vehicle environment, the described machine learning framework can be trained by backpropagating a loss measure from the decoder machine learning model to the first encoder machine learning model. However, given a training data entry that associates the first input data and the second input data for a vehicle environment with a ground-truth prediction for that vehicle environment, the described machine learning framework can be trained by backpropagating a loss measure from the decoder machine learning model to the second encoder machine learning model and then from the second encoder machine learning model to the first encoder machine learning model. In some cases, the first encoder machine learning model is configured to process first input data (e.g., contextual data of a vehicle environment and/or object state data of an object in the vehicle environment) to determine a first encoded representation, the second encoder machine learning model is configured to process second input data (e.g., image data of the object) to determine a second encoded representation, and the decoder machine learning model is configured to process the two encoded representations to determine a prediction.

Accordingly, in some cases, by using some of the techniques described herein, a machine learning framework can be trained by training data having two different schemas (e.g., structures, arrangements, formats, and/or the like). In some cases, training data of a first schema (e.g., the combination of contextual data, object state data, and a ground-truth prediction) may be available at an earlier time than the training data of a second schema (e.g., the combination of contextual data, object state data, image data of an object, and a ground-truth prediction). In some of such cases, the machine learning framework can first be trained based on training data corresponding to the first schema before the training data corresponding to the second schema is available. In some cases, once trained based on training data corresponding to the first schema, the machine learning framework can process input data corresponding to the first schema to determine a prediction. In some cases, when the training data corresponding to the second schema is available (e.g., after an object in an environment comes within an effective visual range of an image sensor, after the object is no longer obscured in the image data of the environment, after a threshold portion of the object is visible in the image data, and/or the like), the machine learning framework may be further trained based on the newly-available training data and to enable performing inferences based on input data corresponding to the second schema. For example, if the first schema corresponds to the first input data of a first encoder machine learning model and the second schema corresponds to combination of the first input data and the second input data of a second encoder machine learning model, then: (i) after training the machine learning framework based on the training data corresponding to the first schema, the first encoder machine learning model and the decoder machine learning model may be trained, and (ii) after training the machine learning framework based on the training data corresponding to the second schema, the first encoder machine learning model, the second encoder machine learning framework, and the decoder machine learning model may be trained.

In some cases, when a training data entry associates contextual data associated with a vehicle environment and/or object state data associated with an object in the vehicle environment to a ground-truth prediction for the vehicle environment, the training data entry may be used to determine a first loss measure that is backpropagated from the decoder machine learning model to a first machine learning model. In some cases, when a training data entry associates at least one of contextual data associated with a vehicle environment or object state data associated with an object in the vehicle environment with image data for the object and a ground-truth prediction for the vehicle environment, the training data entry may be used to determine a second loss measure that is backpropagated from the decoder machine learning model to a second encoder machine learning model (e.g., and then from the second encoder machine learning model to the first encoder machine learning model).

In some cases, the techniques described herein include determining a prediction about a vehicle environment based on: (i) a first predictive output determined using a machine learning framework that includes two encoder machine learning models and a decoder machine learning model, and/or (ii) a second predictive output determined using a portion of the machine learning framework that includes only one of the two encoder machine learning models (e.g., a first encoder machine learning framework) and the decoder machine learning model.

For example, in some cases, the first predictive output described above may be determined by processing contextual data associated with a vehicle environment and/or object state data associated with an object in the vehicle environment using a first encoder machine learning model to determine a first encoded representation, processing image data associated with the object and the first encoded representation to generate a second encoded representation, and processing the second encoded representation using a decoder machine learning model to determine the first predictive output. In some of such cases, the second predictive output described above may be determined by processing contextual data associated with a vehicle environment and/or object state data associated with an object in the vehicle environment using a first encoder machine learning model to determine a first encoded representation, and processing the first encoded representation using a decoder machine learning model to determine the second predictive output. In some cases, the two predictive outputs may be combined to determine the prediction.

In some cases, determining a prediction about a vehicle environment using the two predictive outputs described above includes determining the prediction based on the first predictive input if a quality score for the image data exceeds a threshold value, and/or determining the prediction based on the second predictive input if the quality score does not exceed the threshold value. The quality score for the image data may describe an estimated quality and/or reliability of depiction of the object by the image data. The quality score may be determined based on an estimated size of the image crop associated with the image data, a resolution of the image crop, an angle of the image sensor when capturing the environment image used to determine the image data, an estimated distance of the image sensor from the object when capturing the environment image, and/or the like. In some cases, determining a prediction about a vehicle environment using the two predictive outputs includes combining the two predictive outputs using an ensemble machine learning model to determine the prediction.

In some cases, the techniques described herein include determining image data for an object in a vehicle environment based on an image that is determined based on a heuristic. For example, in some cases, image data for the object includes an image crop of an image of the vehicle environment. In some of such cases, the environment image is determined based on (e.g., selected from) two or more images captured by two or more image sensors (e.g., two or more image sensors located in different locations on the vehicle) in accordance with the heuristic. The heuristic may include one or more criteria for selecting an environment image from a set of environment images to use (e.g., to crop) for generating the image data for the object. In some cases, the heuristic may be determined based on the following: the sizes of the bounding boxes of the object across the images, the resolutions of the images, the distances of the image sensors to the object, and/or the like.

For example, in some cases, if each environment image in a set of environment images is associated with a heuristic evaluation measure that represents the size of the bounding box for an object in the environment image, then the environment image having the highest heuristic evaluation measure may be selected. As another example, in some cases, if each environment image is associated with a heuristic evaluation measure that represents the estimated distance of the image sensor used to capture the environment image to the object when capturing the environment image, then the environment image having the lowest heuristic evaluation measure may be selected. As yet another example, if each environment image is associated with a heuristic evaluation measure that represents the resolution of the image sensor used to capture the environment image when capturing the environment image, then the environment image having the highest heuristic evaluation measure may be selected.

In some cases, the techniques discussed herein include controlling a vehicle based on a prediction about the vehicle environment. In some cases, the prediction describes a predicted future trajectory of another vehicle in the vehicle environment. The predicted future trajectory of the other vehicle may then be used to determine a trajectory for controlling the vehicle and to provide commands to a system controller of the vehicle. The commands provided to the system controller may be configured to control the vehicle in accordance with the determined trajectory for the vehicle to avoid collision with the other vehicle.

In some cases, the techniques discussed herein can be implemented to facilitate and/or enhance safety of automated navigation features in vehicles, such as in automated vehicles or semi-automated vehicles. For example, the techniques can be used to determine a trajectory for an autonomous vehicle and control the autonomous vehicle based on the trajectory. As another example, the techniques can be used to determine that a current trajectory of a vehicle is likely to collide with an object that is within the environment of the vehicle. Upon determining that the current trajectory is likely to collide with an object, the driver of the vehicle may be stopped from following the current trajectory and/or the driver of the vehicle may be alerted about the likelihood of collision. In some cases, upon determining that the current trajectory of an autonomous vehicle is likely to collide with an object in the autonomous vehicle environment, the driver of the autonomous vehicle may be alerted to exercise manual control of the autonomous vehicle.

In some cases, the techniques described herein can be implemented to train machine learning frameworks that determine more accurate predictions (e.g., more accurate predictions about a vehicle environment). As described above, in some cases, the techniques described herein relate to machine learning frameworks that use sensor data (e.g., image sensor data) both directly (e.g., by using image crops of image sensor data) and indirectly (e.g., by using predictive inference outputs and/or transformed representations of the sensor data). As further described above, such twofold usage of sensor data enables the machine learning frameworks to detect both predictive patterns associated with the sensor data and predictive patterns associated with predictive inference outputs determined based on and/or transformed representations of the sensor data. For example, a machine learning framework may both detect predictive patterns in the image data and predictive patterns in contextual data and/or object state data determined based on the image data. In some cases, predictive patterns in the image data may include patterns corresponding to features that are not captured by contextual data and/or object state data, such as one or more previously-undetected and/or previously-unlabeled image features. In some cases, by adopting the twofold sensor data usage techniques described herein, the resulting machine learning frameworks can detect and use a larger number of predictive patterns and perform more accurate predictions.

The methods, apparatuses, and systems described herein can be implemented in a number of ways. Example implementations are provided below with reference to the following figures. Although discussed in the context of a vehicle, the methods, apparatuses, and systems described herein can be applied to a variety of prediction systems and are not limited to vehicles. Further, although various prediction operations are described as being performed by a prediction component of a vehicle computing device, a person of ordinary skill in the relevant technology will recognize that the prediction component may be deployed on other computing devices, such as on a remote computing device that communicates with a vehicle computing device using a networked connection.

FIG. 1 illustrates an example architecture 100 for determining a prediction 162 about a vehicle environment of a vehicle 104 using machine learning models 121-123. The machine learning models 121-123 may be configured to determine the prediction 162 based on contextual data 102 associated with the vehicle environment, object state data 112 representing an object 106 (in this case, another vehicle) in the vehicle environment, and image data 132 representing the object 106.

As depicted in FIG. 1, the machine learning models 121-123 include a first encoder machine learning model 121, a second encoder machine learning model 122, and a decoder machine learning model 123. The machine learning models 121-123 may be trained using ground-truth predictions associated with vehicle environments corresponding to training data entries. Exemplary techniques for training the machine learning models 121-123 are described below with reference to FIG. 2.

In some cases, a machine learning model 121-123 may include a clustering model, a classification model, and/or a regression model. In some examples, a machine learning model 121-123 may include a neural network. In some cases, an exemplary neural network is an algorithm which passes input data through a series of connected layers to produce an output. Each layer in a neural network can also include another neural network, or can include any number of layers (whether convolutional or not). As can be understood in the context of this disclosure, a neural network can utilize machine-learning, which can refer to a broad class of such algorithms in which an output is generated based on learned parameters.

Any type of machine learning algorithm can be used as at least a part of operations of a machine learning model 121-123 consistent with this disclosure. For example, in some cases, machine learning algorithms that can be utilized by a machine learning model 121-123 include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like.

As depicted in FIG. 1, the first encoder machine learning model 121 may be configured to process the contextual data 102 associated with the vehicle environment and object state data 112 representing the object 106 to determine a first encoded representation 141 of the vehicle environment. In some cases, the contextual data 102 includes data representing relative positioning, at a first time, of one or more objects (e.g., the object 106) that are detected within the vehicle environment with respect to the vehicle 104. For example, the contextual data 102 may represent relative positioning of a set of objects detected within the environment with respect to each other and with respect to the vehicle 104.

As depicted in FIG. 1, in some cases, the contextual data 102 may include a top-down view of the vehicle environment that associates the object 106 with a segment of a two-dimensional space representing the vehicle environment. In some cases, the top-down representation of the vehicle environment associates the vehicle 104 with a segment of the two-dimensional space representing the vehicle environment. In some cases, the top-down representation of the vehicle environment associates: (i) each object detected within the environment with a segment of the two-dimensional space representing the environment, and (ii) the vehicle 104 with a segment of the two-dimensional space representing the environment. In some cases, by associating each detected object and the vehicle 104 with respective segments in the two-dimensional space, the top-down representation represents relative distances between pairs of detected objects and/or relative distances between each detected object and the vehicle.

In some cases, the contextual data 102 may include a graph-based model of the vehicle environment, such as a graph-based model generated by a graph neural network (GNN). In some cases, the graph-based model represents the vehicle 104 and active objects in the vehicle environment as nodes. Exemplary techniques for generating graph-based models of a vehicle environment are described U.S. patent application Ser. No. 17/681,461, entitled "Generating Predictions Based on Object Type" and filed on Feb. 25, 2022, which is incorporated by reference herein in its entirety and for all purposes.

In FIG. 1, the contextual data 102 is a top-down representation of the vehicle environment. However, in some other cases, contextual data 102 associated with the vehicle environment includes a vectorized representation of the vehicle environment. In some cases, the vectorized representation associates the object 106 (e.g., and each object detected within the environment) with one or more vectors that represent features associated with a relative location of the object 106 in the environment. In some cases, the vectorized representation can associate each object detected in the environment with a set of vectors each associated with a line segment in a polyline (e.g., a set of line segments) associated with the object. For example, an embedding associated with a detected object can correspond to a segment (e.g., a portion of or all of) the object and represent at least one of length, location, orientation angle (e.g., yaw), and directionality of the segment. In some cases, the object can first be segmented into a set of segments and then each segment can be associated with a line segment in a polyline associated with the object. In some of such cases, each line segment then may be used to determine the vector for the corresponding segment. For example, a lane can be segmented into a number of smaller line segments whose lengths, locations, orientation angles (e.g., yaw measures), and/or directionality measures can be captured using vectors. As another example, a crosswalk may be defined by four connected line segments, and a roadway edge or roadway centerline may be defined by multiple connected line segments. In some cases, the vectorized representation of the vehicle environment represents a location of the vehicle in the vehicle environment (e.g., using a set of vectors that represent features associated with a relative location of the vehicle in the environment, such as a set of vectors that each represent features associated with a line segment for the vehicle). In some cases, by associating the objects detected in the vehicle environment and the vehicle 104 with respective sets of vectors, the vectorized representation of the vehicle environment represents relative distances between pairs of detected objects and/or relative distances between each detected object and the vehicle 104.

In some cases, the object state data 112 associated with the vehicle environment represent one or more features associated with the object 106 detected in the environment at a first time. While the object 106 depicted in FIG. 1 is a vehicle, an object may represent any environment feature that is detected within the vehicle environment based on the sensor data captured by one or more sensors associated with the vehicle and/or based on map data associated with the vehicle environment. Examples of objects include other vehicles present in the vehicle environment, pedestrians present in the vehicle environment, roadway objects (e.g., traffic lights, signs, and/or the like) present in the vehicle environment, and/or the like. As these examples illustrate, objects that may be detected in the vehicle environment may include static objects (e.g., traffic lights) whose position is not expected to change while the vehicle is in the vehicle environment and dynamic objects (e.g., vehicles or pedestrians) whose positions is expected to change while the vehicle is in the vehicle environment. In some cases, object state data 112 associated with an object may represent whether the object is a static object or a dynamic object.

In some cases, the object state data 112 associated with the object 106 represent at least one of a location/position of the object 106 within the vehicle environment at the first time, an orientation (e.g., yaw, roll, and/or pitch) of the object 106 within the vehicle environment at the first time, a velocity of the object 106 within the vehicle environment at the first time, a speed of the object 106 within the vehicle environment at the first time, an acceleration of the object 106 within the vehicle environment at the first time, a jerk of the object 106 within the vehicle environment at the first time, and/or the like. In some cases, the object state data 112 associated with the object 106 represent at least one of a bounding box 114 representing the object within an image of the vehicle environment, a detected velocity of the object 106, or a detected acceleration of the object 106. In some cases, the object state data associated with the object represent the bounding box 114 associated with the object by representing at least one of: (i) coordinates for at least one corner (e.g., all eight corners) of the bounding box 114. (ii) coordinates for a centroid of the bounding box 114 (e.g., a centroid that is determined based on a center of gravity of the object and/or a central point of the bounding box 114), or (iii) an orientation measure (e.g., a yaw measure, a roll measure, and/or a pitch measure) associated with the bounding box 114. In some cases, the object state data associated with the object 106 represent a covariance norm of a detected velocity of the object 106, a detected acceleration of the object 106, and a detected position of the object 106.

In some cases, the object state data 112 associated with the object 106 at a first time represent both features of the object 106 at the first time and features of the object 106 for one or more preceding times before the first time (e.g., one or more preceding times in a defined time sequence, such as a sequence of prediction times, a sequence of sensor data capture times, and/or the like). For example, the object state data 112 associated with the object 106 at a first time may represent features of the object 106 at the first time and features of the object 106 for any preceding times before the first time for up to N such preceding times. In some of those cases, N may be a hyperparameter of the machine learning framework including the machine learning models 121-123. In some cases, the features of timestep that may be represented by the object state data 112 for the object 106 include at least one of a location/position of the object 106 within the vehicle environment at the corresponding timestep, an orientation (e.g., yaw, roll, and/or pitch) of the object 106 within the vehicle environment at the corresponding timestep, a velocity of the object 106 within the vehicle environment at the corresponding timestep, a speed of the object 106 within the vehicle environment at the corresponding timestep, an acceleration of the object 106 within the vehicle environment at the corresponding timestep, a jerk of the object 106 within the vehicle environment at the corresponding timestep, and/or the like. Accordingly, in some cases, the object state data 112 include object history data associated with the object 106.

In some cases, the image data 132 represents one or more objects within the vehicle environment, such as one or more objects of one or more particular classes (e.g., vehicles, cyclists, pedestrians, and/or the like) and/or one or more particular locations (e.g., within a threshold distance of the vehicle 104). In some cases, the image data 132 represents one or more objects within the vehicle environment, where the one or more objects are identified by a machine learning model that is configured to determine (e.g., based on sensor data associated with the vehicle environment) one or more most relevant objects in the vehicle environment. In some cases, the image data 132 may be captured by image sensors of one or more vehicles, by one or more remote sensors, and/or the like.

In some cases, the first encoder machine learning model 121 includes: (i) a first encoding sub-model that is configured to process the contextual data 102 to determine a first fixed-size encoding. (ii) a second encoding sub-model that is configured to process the object state data 112 to determine a second fixed-size encoding, and (iii) a merger sub-model that is configured to combine the two fixed-size encodings to determine the first encoded representation 141. In some cases, the first encoding sub-model includes a set of feed-forward neural network layers (e.g., a set of fully-connected feedforward neural network layers) and/or a set of graph neural network layers (e.g., a set of graph convolutional neural network layers). In some cases, the second encoding sub-model includes a set of recurrent neural network layers and/or a set of feedforward neural network layers. In some cases, the merger sub-model includes a concatenation layer and/or a set of feedforward neural network layers.

As depicted in FIG. 1, the second encoder machine learning model 122 may be configured to process image data 132 associated with the object 106 to determine a second encoded representation 142 of the vehicle environment. In some cases, the image data 132 represent an image representation of the object 106 in the vehicle environment at a first time. In some cases, the image data 132 is determined based on an image captured from the vehicle environment at an image capture time associated with the first time (e.g., at the first time, at an image capture time that is within a threshold temporal proximity to the first time, and/or the like). For example, the image data 132 may represent an image crop of the environment image, where the image crop is predicted to depict the object 106. In some of such cases, the environment image that is cropped to determine the image data 132 for the object is determined by merging one or more images of the vehicle environment that are captured by one or more image sensors (e.g., a visible light spectrum camera, a depth camera, an infrared camera, etc.) of the vehicle 104. In some cases, the image data 132 representing the object 106 include one or more image crops each being a cropped portion of the vehicle environment that is predicted to depict the object 106. For example, the image data 132 may include a cropped portion of the vehicle environment image captured by a visible light spectrum camera that is predicted to depict the object 106, a cropped portion of the vehicle environment image captured by a depth camera that is predicted to depict the object 106, a cropped portion of the vehicle environment image captured by an infrared camera that is predicted to depict the object 106, and/or the like.

In some cases, the image data 132 representing the object 106 include image metadata features associated with an image used to determine the image data 132. For example, if the image data include a cropped portion of an image that is configured to depict the vehicle environment image, then the image data 132 may further include one or more image metadata features representing features of an image sensor used to capture the image, such as at least one of an image sensor type (e.g., camera type) of the image sensor, an image sensor angle (e.g., camera angle) of the image sensor when capturing the image, an image sensor resolution of the image sensor, an image sensor location of the image sensor when capturing the image, and/or the like. In some cases, the image metadata features associated with an image include one or more predicted labels associated with an object depicted by the image, for example, one or more predicted labels determined by processing the image and/or a portion of the image that depicts the object using a perception machine learning model. Examples of the predicted labels for an object include a label describing a prediction about whether the object is displaying a turn signal, a label describing a prediction about whether the brake lights of the object are on, a label describing a prediction about positions of the wheels of the object, and/or the like. In some cases, a feature vector that includes a set of predicted labels for the object is provided as part of the image data 132 and/or as input data for the second encoder machine learning model 122.

In some cases, the image data 132 include a video of the object 106 at a defined time period before the first time. In some cases, the image data 132 of the object 106 and/or the environment image(s) used to determine the image data 132 are used to determine at least one of the contextual data 102 associated with the vehicle environment and/or the object state data 112 representing the object 106 in the vehicle environment.

In some cases, image data 132 representing the object 106 includes an image crop of an image of the vehicle environment that is predicted to depict the object 106. In some of such cases, the environment image is determined based on (e.g., selected from) two or more images captured by two or more image sensors (e.g., two or more image sensors located in different locations on the vehicle) in accordance with a heuristic. The heuristic may include one or more criteria for selecting an environment image from a set of environment images to use (e.g., to crop) for generating the image data 132 for the object 106. In some cases, the heuristic may be determined based on the following: the sizes of the bounding boxes of the object across the images, the resolutions of the images, the distances of the image sensors to the object, and/or the like. Exemplary techniques for determining image data representing an object in a vehicle environment based on two or more images of the vehicle environment are described below with reference to FIG. 3.

In some cases, the image data 132 representing the object 106 is determined by receiving one or more images representing the vehicle environment (e.g., from one or more image sensors of the vehicle 104), processing the one or more images to detect a bounding box in at least one of the images, cropping an image portion corresponding to the bounding box, and determining the image data 132 based on the cropped image portion. In some cases, the image data 132 representing the object 106 is determined by processing sensor data captured from the vehicle environment to determine, in addition to the image data 132, the contextual data 102 and the object state data 112. Exemplary techniques for processing sensor data captured from a vehicle environment to determine contextual data associated with the vehicle environment, object state data representing an object in the vehicle environment, and image data representing the object is described below with reference to FIG. 5.

In some cases, the second encoder machine learning model 122 includes one or more convolutional neural network layers. In some cases, the second encoder machine learning model 122 includes: (i) an encoding sub-model that is configured to process the image data 132 to determine a fixed-size encoding, and (ii) a merger sub-model that is configured to combine the fixed-size encoding and the first encoded representation 141 to determine the second encoded representation 142. In some cases, the encoding sub-model includes a set of more convolutional neural network layers and/or a set of feedforward neural network layers (e.g., a set of fully-connected feedforward neural network layers). In some cases, the merger sub-model includes a concatenation layer and/or a set of feedforward neural network layers.

As depicted in FIG. 1, the decoder machine learning model 123 is configured to process the second encoded representation 142 to determine the prediction 162 about the vehicle environment. Although not depicted in FIG. 1, in some cases, the decoder machine learning model 123 is configured to determine the prediction 162 based on both the second encoded representation 142 and the object state data 112. In some cases, the decoder machine learning model 123 includes a set of feedforward neural network layers (e.g., a set of fully-connected feedforward neural network layers). The prediction 162 may include any prediction about a current and/or a future state of an object in the vehicle environment. For example, in the exemplary implementation depicted in FIG. 1, the prediction 162 includes a predicted trajectory 164 for the object 106.

In some cases, to determine the prediction 162, the decoder machine learning model 123: (i) processes the second encoded representation 142 (e.g., along with the object state data 112) to determine a first predictive output, (ii) processes the first encoded representation 141 to determine a second predictive output, and (iii) combines the two predictive outputs to determine the prediction 162. In some cases, determining the prediction 162 using the two predictive outputs includes determining the prediction 162 based on the first predictive input if a quality score for the image data 132 exceeds a threshold value, and/or determining the prediction 162 based on the second predictive input if the quality score does not exceed the threshold value. The quality score for the image data 132 may describe an estimated quality and/or reliability of depiction of the object 106 by the image data 132. The quality score may be determined based on an estimated size of the image crop associated with the image data 132, a resolution of the image crop, an angle of the image sensor when capturing the environment image used to determine the image data 132, an estimated distance of the image sensor from the object 106 when capturing the environment image, and/or the like. In some cases, determining the prediction 162 using the two predictive outputs includes combining the two predictive outputs using an ensemble machine learning model to determine the prediction. In some cases, the ensemble machine learning model includes a set of feedforward neural network layers (e.g., a set of fully-connected feedforward neural network layers).

Figure 2:
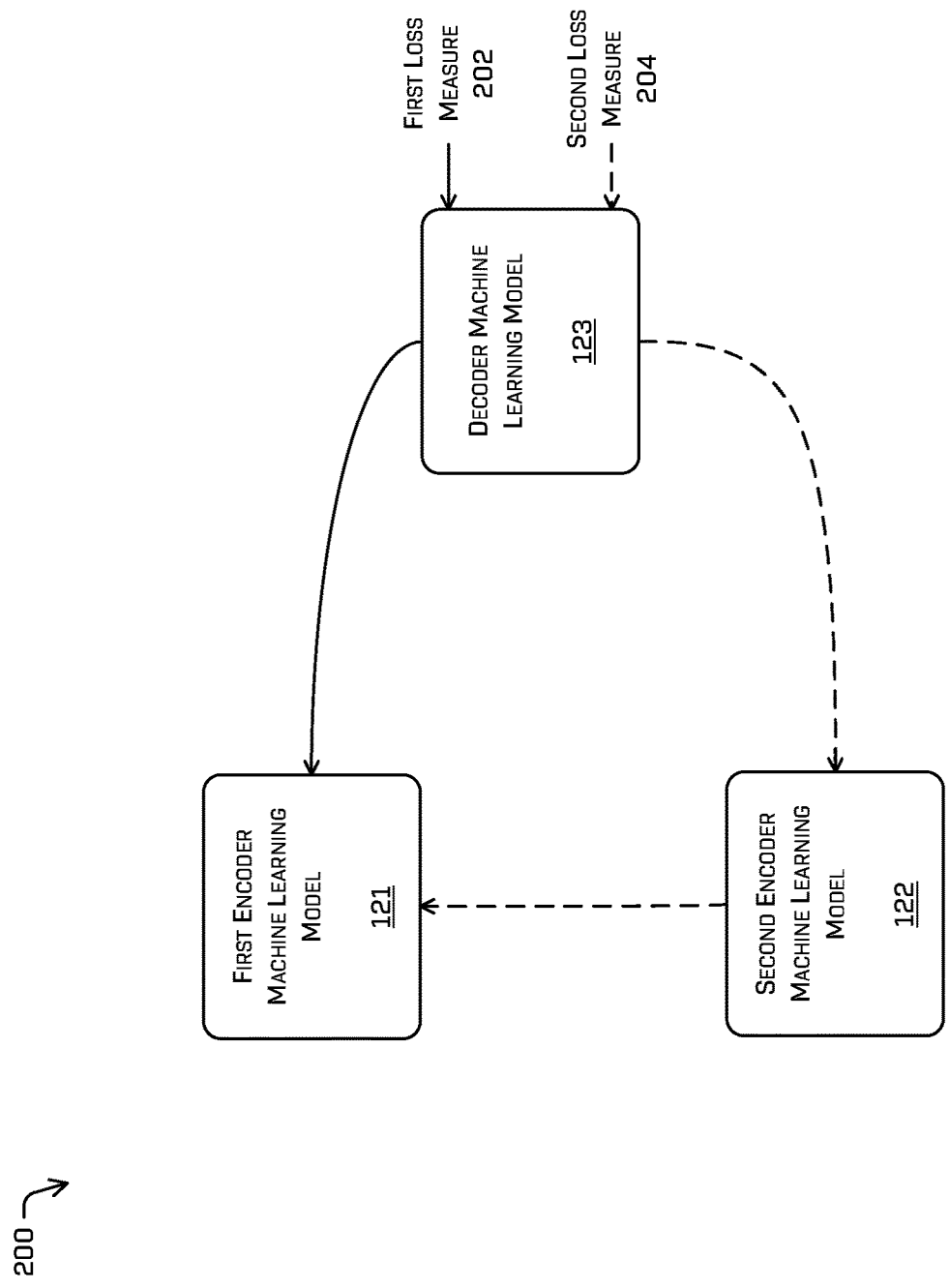
FIG. 2 depicts an example process for training a set of machine learning models used to determine a prediction about a vehicle environment.

FIG. 2 depicts an example process 200 for training the machine learning models 121-123. As depicted in FIG. 2, training the machine learning models 121-123 includes backpropagating a first loss measure 202 from the decoder machine learning model 123 and backpropagating a second loss measure 204 from the decoder machine learning model 123 to the second encoder machine learning model 122 and then from the second encoder machine learning model 122 to the first encoder machine learning model 121.

In some cases, when a training data entry associates the contextual data for a vehicle environment, the object state data for an object in the vehicle environment, and a ground-truth prediction for the vehicle environment, then the first loss measure 202 may be determined based on a deviation between the ground-truth prediction and an inferred prediction determined by the decoder machine learning model 123 during training and based on the contextual data and the object state data in the training data entry. The first loss measure 202 may be a gradient of a loss function that relates the deviation to parameter values for the decoder machine learning model 123 and the first encoder machine learning model 121. In some cases, the first loss measure 202 is backpropagated to the decoder machine learning model 123 and the first encoder machine learning model 121.

In some cases, when a training data entry associates the contextual data for a vehicle environment, the object state data for an object in the vehicle environment, the image data of the object, and a ground-truth prediction for the vehicle environment, then the second loss measure 204 may be determined based on a deviation between the ground-truth prediction and an inferred prediction determined by the decoder machine learning model 123 during training and based on the contextual data, the object state data, and the image data in the training data entry. The second loss measure 204 may be a gradient of a loss function that relates the deviation to parameter values for the decoder machine learning model 123, the second encoder machine learning model 122, and the first encoder machine learning model 121. In some cases, the second loss measure 204 is backpropagated to the decoder machine learning model 123, the second encoder machine learning model 122, and the first encoder machine learning model 121. In some examples, after training the first encoder machine learning model 121 at a first training time (e.g., based on the first loss measure 202), the weight associated with the first encoder machine learning model 121 can be "frozen" or otherwise fixed such that they are not further modified by second training operations at a second time that are configured to train the second encoder machine learning model 122 (e.g., based on the second loss measure 204).

Figure 3:
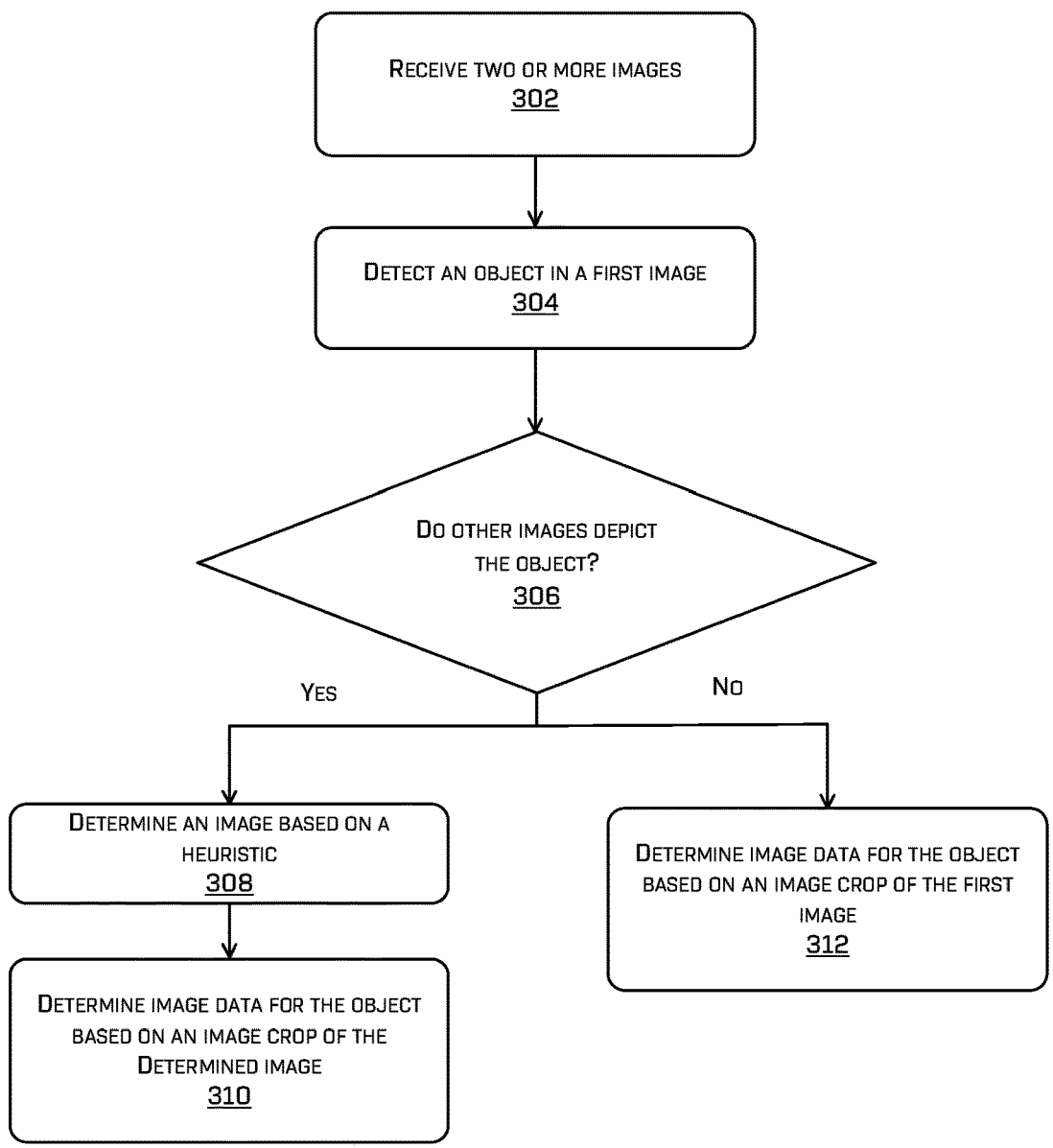
FIG. 3 depicts an example process for determining image data representing an object in a vehicle environment based on two or more images of the vehicle environment.

FIG. 3 depicts an example process 300 for determining image data representing an object in a vehicle environment based on two or more images of the vehicle environment. As depicted in FIG. 3, at operation 302, the process 300 includes receiving image sensor data including two or more images of the vehicle environment. In some cases, the two or more images are captured by two or more image sensors (e.g., two or more image sensors located in different locations on the vehicle) of the vehicle. In some cases, the two or more images are captured at two or more distinct times. In some cases, each of the two or more images is associated with a distinct image sensor position and/or image sensor orientation that is associated with capturing of the image by an image sensor.

At operation 304, the process 300 includes detecting the object in a first image from the two or more images of the vehicle environment. In some cases, detecting the object in the first image includes detecting a bounding box in the first image that is predicted to depict the object. In some cases, the two or more images are processed (e.g., sequentially and/or in parallel) to detect bounding boxes associated with objects in the images. In some of such cases, the first image is the initial image in which a bounding box is detected. In some cases, detecting the object in the first image includes detecting a bounding box in the first image that is predicted to depict the object and determining bounding box feature data for the bounding box. Examples of bounding box feature data include at least one of an object type of the object associated with the bounding box, a centroid of the bounding box, a yaw measure for the object associated with the bounding box, and/or the like.

At operation 306, the process 300 includes determining whether the object is depicted in any images from the two or more images of the vehicle environment other than the first image. In some cases, after a first bounding box is detected in the first image, the location of the first bounding box in the first image is projected into the other images (e.g., based on relative positions of the image sensors used to capture the two or more images). In some of such cases, if the projected location of the first bounding box in a second image is not outside of the bounds of the second image and is associated with a bounding box that is detected in the second image, then the second image is predicted to depict the object that is associated with the first bounding box. In some cases, after a first bounding box is detected in the first image, bounding box feature data for other bounding boxes detected in other images are compared to bounding box feature data for the first bounding box to determine whether any of those other bounding boxes correspond to the same object as the object associated with the first bounding box. In some of such cases, if the described comparisons indicate that a second bounding box in a second image corresponds to the same object as the object that is associated with the first bounding box, then the second image is predicted to depict the object.

At operation 308, the process 300 includes determines and/or selects, based on a heuristic, an image from the images of the environment that are predicted to depict the object if it is determined that the first image and at least one other image from the two or more images of the vehicle environment depict the object. The heuristic may include one or more criteria for selecting an environment image from a set of environment images to use (e.g., to crop) for generating the image data for the object. In some cases, the heuristic may be determined based on the following: the sizes of the bounding boxes of the object across the images, the resolutions of the images, the distances of the image sensors to the object, and/or the like. For example, in some cases, if each environment image in a set of environment images is associated with a heuristic evaluation measure that represents the size of the bounding box for an object in the environment image, then the environment image having the highest heuristic evaluation measure may be selected.

At operation 310, the process 300 includes determining the image data for the object based on an image crop of the determined/selected image if it is determined that the first image and at least one other image from the two or more images of the vehicle environment depict the object. In some cases, the image crop is a cropped portion of the determined/selected image that is predicted to depict the object. In some of such cases, the cropped portion includes the portion of the determined/selected image that corresponds to the bounding box associated with the object in the selected image.

At operation 312, the process 300 includes determining the image data for the object based on an image crop of the first image if it is determined that only the first image depicts the object. In some cases, the image crop is a cropped portion of the first image that is predicted to depict the object. In some of such cases, the cropped portion includes the portion of the first image that corresponds to the bounding box associated with the object in the first image.

Figure 4:
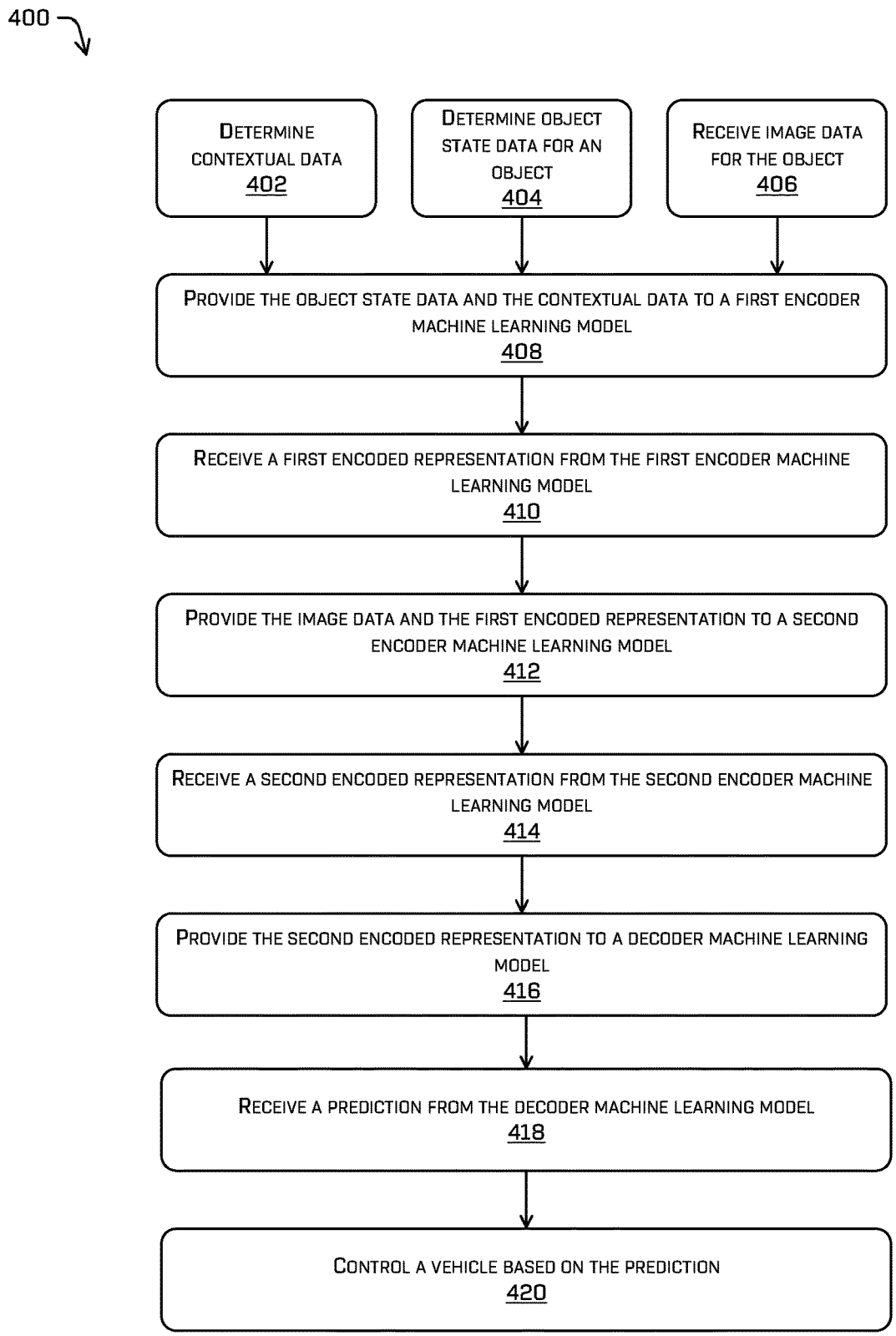
FIG. 4 depicts an example process for generating a prediction about a vehicle environment and for controlling the vehicle based on the prediction.

FIG. 4 depicts an example process 400 for generating a prediction about a vehicle environment and for controlling the vehicle based on the prediction. As depicted in FIG. 4, at operation 402, the process 400 includes determining contextual data for a vehicle environment at a first time. In some cases, the contextual data includes data representing relative positioning, at the first time, of one or more objects that are detected within the vehicle environment. For example, the contextual data may represent relative positioning of a set of objects detected within the environment with respect to each other and/or with respect to the vehicle. In some cases, the contextual data may include a top-down view of a vehicle environment that associates an object detected within the vehicle environment with a segment of a two-dimensional space representing the vehicle environment. In some cases, contextual data associated with the vehicle environment includes a vectorized representation of the vehicle environment. In some cases, the vectorized representation associates an object (e.g., each object) detected within the environment with one or more vectors that represent features associated with a relative location of the object in the environment.

At operation 404, the process 400 includes determining object state data representing a feature of an object in the vehicle environment at the first time. In some cases, the object state data associated with an object represent at least one of a bounding box representing the object (e.g., a bounding box representing the object within an image of the vehicle environment), a detected velocity of the object, or a detected acceleration of the object. In some cases, the object state data associated with an object at a first time represent both features of the object at the first time and features of the object for one or more preceding times before the first time (e.g., one or more preceding times in a defined time sequence, such as a sequence of prediction times, a sequence of sensor data capture times, and/or the like). For example, the object state data associated with an object a first time may represent features of the object at the first time and features of object for any preceding times before the first time for up to N such preceding times.

At operation 406, the process 400 includes determining or receiving image data representing the object at the first time. In some cases, the image data includes an image representation of the object in the vehicle environment at the first time. In some cases, the image data is determined based on an image captured from the vehicle environment at an image capture time associated with the first time (e.g., at the first time, at an image capture time that is within a threshold temporal proximity to the first time, and/or the like). For example, the image data may represent an image crop of the environment image, where the image crop is predicted to depict the object. In some cases, the image data representing an object a first time represent image sensor metadata associated with one or more images used to determine the image data.

At operation 408, the process 400 includes providing the contextual data and the object state data to a first encoder machine learning model. In some cases, the first encoder machine learning model includes: (i) a first encoding sub-model that is configured to process the contextual data to determine a first fixed-size encoding. (ii) a second encoding sub-model that is configured to process the object state data to determine a second fixed-size encoding, and (iii) a merger sub-model that is configured to combine the two fixed-size encodings to determine a first encoded representation.

At operation 410, the process 400 includes receiving a first encoded representation of the vehicle environment from the first encoder machine learning model. In some cases, the first encoder machine learning model is configured to process the contextual data and the object state data to determine the first encoded representation.

At operation 412, the process 400 includes providing the image data and the first encoded representation to a second encoder machine learning model. In some cases, the second encoder machine learning model includes one or more convolutional neural network layers. In some cases, the second encoder machine learning model includes: (i) an encoding sub-model that is configured to process the image data to determine a fixed-size encoding, and (ii) a merger sub-model that is configured to combine the fixed-size encoding and the first encoded representation to determine a second encoded representation.

At operation 414, the process 400 includes receiving a second encoded representation of the vehicle environment from the second encoder machine learning model. In some cases, the second encoder machine learning model is configured to process the first encoded representation and the image data to determine the second encoded representation.

At operation 416, the process 400 includes providing the second encoded representation to a decoder machine learning model. In some cases, the decoder machine learning model is configured to process the second encoded representation to determine a prediction. In some cases, the decoder machine learning model is configured to process the second encoded representation and an additional input such as the contextual data to determine a prediction. In some cases, the decoder machine learning model includes a set of feedforward neural network layers.

At operation 418, the process 400 includes receiving the prediction from the decoder machine learning model. The prediction may include any prediction about a current and/or a future state of an object in the vehicle environment, such as a predicted future trajectory of another vehicle in the vehicle environment.

At operation 420, the process 400 includes controlling the vehicle based on the prediction. In some cases, the prediction describes a predicted future trajectory of another vehicle in the vehicle environment. The predicted future trajectory of the other vehicle may be used to determine a trajectory for controlling the vehicle and to provide commands to a system controller of the vehicle. The commands provided to the system controller may be configured to control the vehicle in accordance with the determined trajectory for the vehicle to avoid collision with the other vehicle. In some cases, upon determining that the current trajectory of the vehicle is likely to collide with an object based on the predicted future trajectory of the object, the driver of the vehicle may be stopped from following the current trajectory and/or the driver of the vehicle may be alerted about the likelihood of collision.

Figure 5:
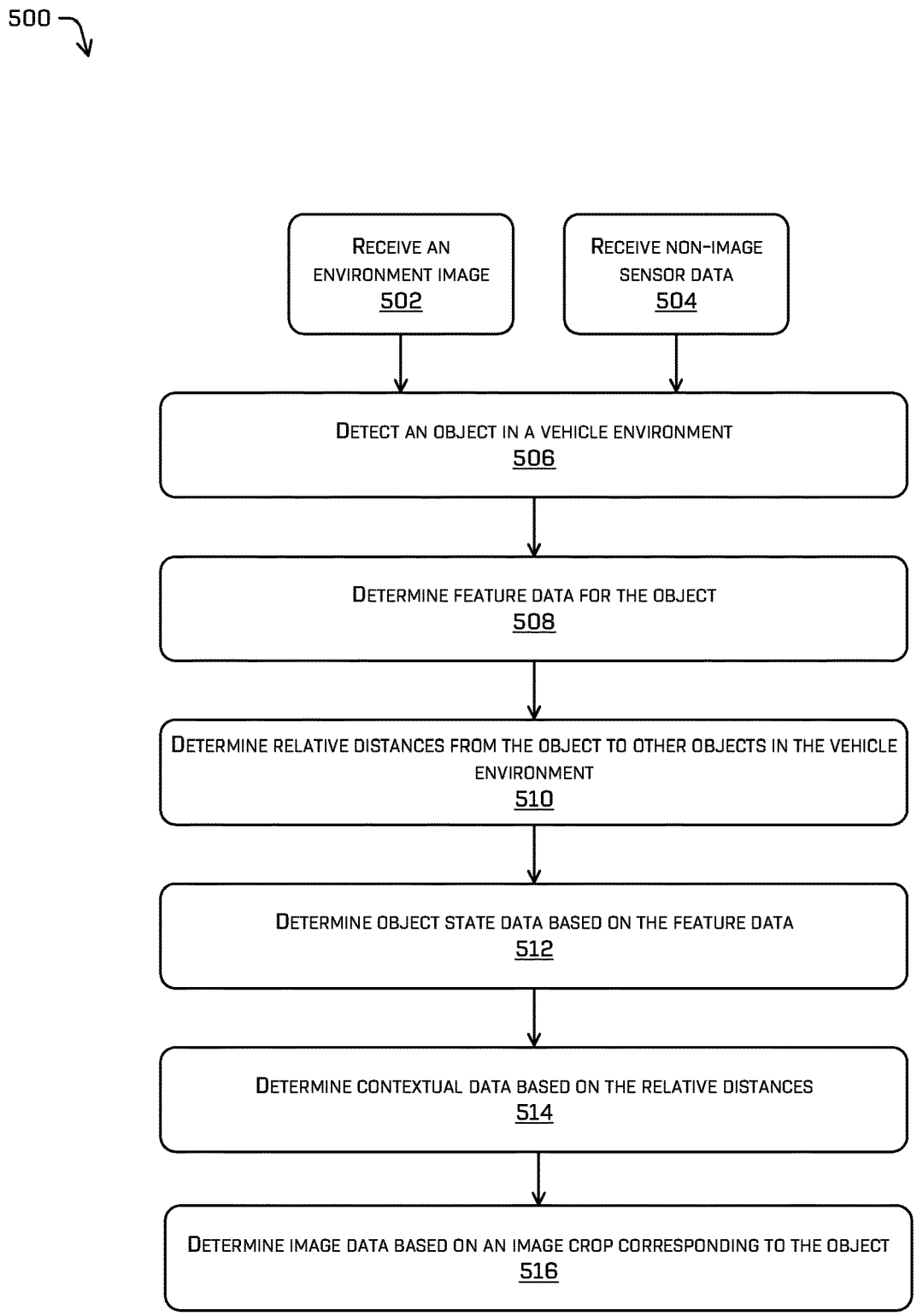
FIG. 5 depicts an example process for processing sensor data captured from a vehicle environment to determine contextual data associated with the vehicle environment, object state data representing an object in the vehicle environment, and image data representing the object.

FIG. 5 depicts an example process 500 for processing sensor data captured from a vehicle environment to determine contextual data associated with the vehicle environment, object state data representing an object in the vehicle environment, and image data representing the object. As depicted in FIG. 5, at operation 502, the process 500 includes receiving an image of the vehicle environment from an image sensor of the vehicle. Examples of image sensors include a visible light spectrum camera, a depth camera, an infrared camera, and/or the like. In some cases, the environment image is generated by merging one or more images of the vehicle environment that are captured by the one or more image sensors.

At operation 504, the process 500 includes receiving non-image sensor data of the vehicle environment from one or more non-image sensors of the vehicle. In some cases, lidar data of the vehicle environment is received from one or more lidar sensors of the vehicle. In some cases, the lidar data includes a lidar point cloud that includes lidar readings for one or more segments of the vehicle environment. In some cases, radar data of the vehicle environment is received from one or more radar sensors of the vehicle. In some cases, the radar data includes a radar point cloud that includes radar readings for one or more segments of the vehicle environment. In some cases, sonar data of the vehicle environment is received from one or more sonar sensors of the vehicle. In some cases, the sonar data includes a sonar point cloud that includes sonar readings for one or more segments of the vehicle environment.

At operation 506, the process 500 includes detecting an object in the vehicle environment based on the sensor data including the environment image and the non-image sensor data. In some case, the object is associated with a location within the environment image. In some cases, the sensor data is provided to as input data to a perception machine learning model that is configured to detect a bounding box for depiction of an object in the environment image. For example, inputs to the perception machine learning model may include one or more input channels, including at least one of an image channel (e.g., a red-green-blue (RGB) channel) determined based on the environment image, a lidar channel determined based on the lidar data, a radar channel determined based on the radar data, a sonar channel determined based on the sonar data, and/or the like. In some cases, outputs of the perception machine learning model include bounding box feature data for a bounding box detected within the environment image, such as at least one of: (i) coordinates for at least one corner (e.g., all eight corners) of the bounding box, (ii) coordinates for a centroid of the bounding box (e.g., a centroid that is determined based on a center of gravity of the object and/or a central point of the bounding box), or (iii) an orientation measure (e.g., a yaw measure, a roll measure, and/or a pitch measure) associated with the object that is depicted bounding box.

At operation 508, the process 500 includes determining feature data for a first detected object. In some cases, feature data associated with the first detected object are generated by a perception machine learning model that is used to detect the first detected object. Examples of object features for an object include at least one of the bounding box for the object, a velocity for the object, an acceleration for the object, a speed of the object, a jerk of the object, and/or the like. In some cases, feature data associated with the object include feature data for a current timestep and for up to N timesteps before the current time.

At operation 510, the process 500 includes determining relative distances from the first detected object to other detected objects in the vehicle environment based on locations of the objects within the environment image. In some cases, the distance between two objects is determined based on a length of a vector between the locations of the two objects in the environment image. In some cases, the distance between two objects is determined based on a length of a vector between the bounding boxes of the two objects. In some cases, in addition to relative distances of objects to each other, relative distances of the objects to the vehicle are also determined. In some cases, to convert a distance to a relative distance, the distance is normalized using a normalization ratio that is common to all of the relative distances represented by contextual data associated with the vehicle environment.

At operation 512, the process 500 includes determining object state data representing the first detected object based on the feature data for the first detected object. In some cases, the object state data describes the feature data determined at operation 508 and/or one or more features determined by performing feature engineering operations on the feature determined at operation 508. In some cases, the object state data is determined based on feature data associated with a current timestep as well as feature data associated with up to N timesteps before the current timestep.

At operation 514, the process 500 includes determining contextual data associated with the vehicle environment based on the relative distances between the first detected object and other detected objects in the environment. In some cases, the contextual data represents relative positioning of a set of objects detected within the environment with respect to each other and/or with respect to the vehicle om the environment. In some cases, the contextual data represents relative distances between pairs of detected objects and/or relative distances between each detected object and the vehicle.

At operation 516, the process 500 includes determining image data representing the first detected object based on the location of the first detected object in the environment image. In some cases, the image data includes an image crop of the environment image that includes an image region corresponding to the location of the first detected object. In some cases, the image data includes an image crop of the environment image that includes an image region corresponding to the bounding box associated with the first detected object. In some cases, the image data includes metadata features associated with an image sensor used to capture the environment image.

Figure 6:
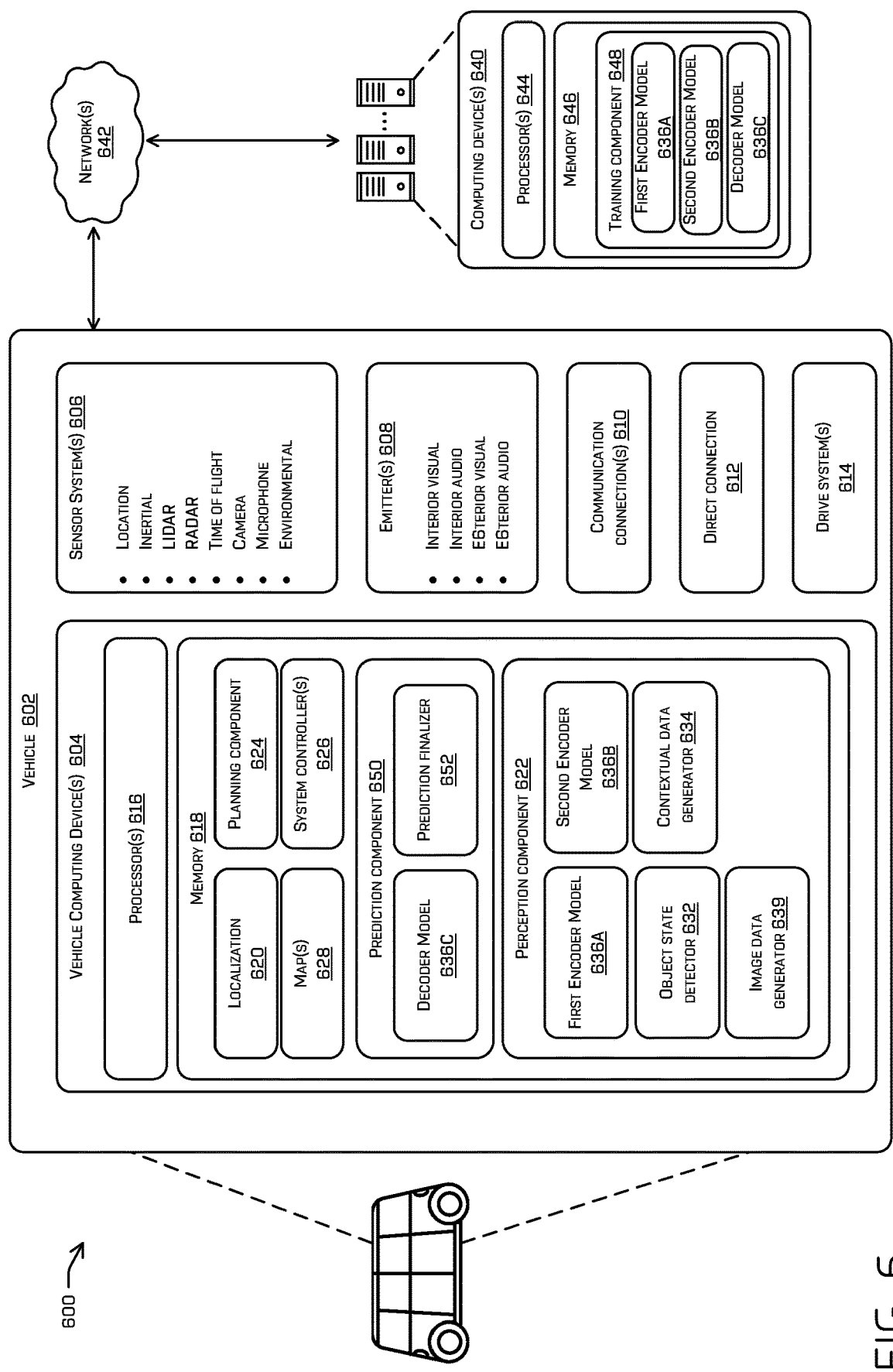
FIG. 6 depicts a block diagram of an example system for implementing the techniques described herein.

FIG. 6 depicts a block diagram of an example system 600 for implementing the techniques described herein. In at least one example, the system 600 may include a vehicle 602.

The vehicle 602 may include a vehicle computing device 604, one or more sensor systems 606, one or more emitters 608, one or more communication connections 610, at least one direct connection 612, and one or more drive systems 614.

The vehicle computing device 604 may include one or more processors 616 and memory 618 communicatively coupled with the one or more processors 616. In the illustrated example, the vehicle 602 is an autonomous vehicle; however, the vehicle 602 could be any other type of vehicle. In the illustrated example, the memory 618 of the vehicle computing device 604 stores a localization component 620, a perception component 622, a planning component 624, a prediction component 650, one or more system controllers 626, and one or more maps 628. Though depicted in FIG. 6 as residing in memory 618 for illustrative purposes, it is contemplated that the localization component 620, the perception component 622, the planning component 624, the prediction component 650, the one or more system controllers 626, and the one or more maps 628 may additionally, or alternatively, be accessible to the vehicle 602 (e.g., stored remotely).

In at least one example, the localization component 620 may include functionality to receive data from the sensor system(s) 606 to determine a position of the vehicle 602. For example, the localization component 620 may include and/or request/receive a three-dimensional map of an environment and may continuously determine a location of the autonomous vehicle within the map. In some instances, the localization component 620 may utilize SLAM (simultaneous localization and mapping) or CLAMS (calibration, localization and mapping, simultaneously) to receive image data, lidar data, radar data, IMU data, GPS data, wheel encoder data, and the like to accurately determine a location of the autonomous vehicle. In some instances, the localization component 620 may provide data to various components of the vehicle 602 to determine an initial position of an autonomous vehicle for generating a candidate trajectory.

In some instances, the perception component 622 may include functionality to perform object detection, segmentation, and/or classification. In some examples, the perception component 622 may provide processed sensor data that indicates a presence of an entity that is proximate to the vehicle 602 and/or a classification of the entity as an entity type (e.g., car, pedestrian, cyclist, building, tree, road surface, curb, sidewalk, unknown, road feature, etc.). In examples, the perception component 622 may process sensor data to identify a road feature (e.g., an intersection, parking lane, signal light, stop sign, etc.), determine a proximity of the road feature to the vehicle 602, and/or provide data regarding the road feature (e.g., proximity, etc.) as processed sensor data. In additional and/or alternative examples, the perception component 622 may provide processed sensor data that indicates one or more characteristics associated with a detected entity and/or the environment in which the entity is positioned. In some examples, characteristics associated with an entity may include, but are not limited to, an x-position, a y-position, a z-position, an orientation, an entity type (e.g., a classification), a velocity of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

In examples, the perception component 622 may include an object state detector 632 that is configured to determine object state data for an object in the vehicle environment (e.g., object state data 112 of FIG. 1), for example in accordance with the techniques described in relation to FIG. 5. In examples, the perception component 622 may include a contextual data detector 634 that is configured to determine contextual data for a vehicle environment (e.g., contextual data 102 of FIG. 1), for example in accordance with the techniques described in relation to FIG. 5. In examples, the perception component 622 may include image data detector 639 that is configured to determine image data representing an object in the vehicle environment (e.g., image data 132 of FIG. 1), for example in accordance with the techniques described in relation to FIGS. 4-5.

In examples, the perception component 622 may include a first encoder machine learning model 636A (e.g., the first encoder machine learning model 121 of FIG. 1) that is configured to generate a first encoded representation of the vehicle environment (e.g., the first encoded representation 141 of FIG. 1) based on at least one of the contextual data of the vehicle environment as determined using the contextual data detector 634 or object state for an object in the vehicle environment as determined using the object state data detector 632. In examples, perception component 622 may include a second encoder machine learning model 636B (e.g., the second encoder machine learning model 122 of FIG. 1) that is configured to generate a second encoded representation of the vehicle environment (e.g., the second encoded representation 142 of FIG. 1) based on at least one of the image data of an object in the vehicle environment as determined using the image data detector 639 and/or the first encoded representation as determined using the first encoder machine learning model 636A.

In examples, the planning component 624 may determine a path for the vehicle 602 to follow to traverse through an environment. For example, the planning component 624 may determine various routes and trajectories and various levels of detail. For example, the planning component 624 may determine a route to travel from a first location (e.g., a current location) to a second location (e.g., a target location). For the purpose of this discussion, a route may be a sequence of waypoints for travelling between two locations. As non-limiting examples, waypoints include streets, intersections, GPS coordinates, etc. Further, the planning component 624 may generate an instruction for guiding the autonomous vehicle along at least a portion of the route from the first location to the second location. In at least one example, the planning component 624 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique.

In examples, the prediction component 650 may include functionality to determine a prediction about the vehicle environment (e.g., the prediction 162 of FIG. 1), for example a prediction about the trajectory of another vehicle in the environment. In some cases, the prediction component 650 may include a decoder machine learning model 636C that is configured to determine the prediction based on at least one of the second encoded representation of the vehicle environment as determined by the second encoder machine learning model 636B or the contextual data as determined using the contextual data detector 634. In examples, the prediction component may include a trajectory generator 652 that generates a predicted future trajectory for an object (e.g., another vehicle) in the vehicle environment based on the prediction generated by the decoder machine learning model 636C.

In at least one example, the one or more system controllers 626 may be configured to control steering, propulsion, braking, safety, emitters, communication, and other systems of the vehicle 602. The system controller(s) 626 may communicate with and/or control corresponding systems of the drive system(s) 614 and/or other components of the vehicle 602.

The memory 618 may further include the one or more maps 628 that may be used by the vehicle 602 to navigate within the environment. For example, a map may be any number of data structures modeled in two dimensions or three dimensions that are capable of providing information about an environment, such as, but not limited to, topologies (such as intersections), streets, mountain ranges, roads, terrain, and the environment in general. In one example, a map may include a three-dimensional mesh. In some instances, the map may be stored in a tiled format, such that individual tiles of the map represent a discrete portion of an environment, and may be loaded into working memory as needed. In some instances, the map(s) 628 may be divided into tiles by the vehicle computing device 604, by a computing device(s) 640, or by a combination of the two.

In some examples, the one or more maps 628 may be stored on a remote computing device(s) (such as the computing device(s) 640) accessible via network(s) 642. In some examples, multiple maps 628 may be stored based on, for example, a characteristic (e.g., type of entity, time of day, day of week, season of the year, etc.). Storing multiple maps 628 may have similar memory requirements, but increase the speed at which data in a heat map may be accessed.

In some instances, aspects of some or all of the components discussed herein may include any models, algorithms, and/or machine learning algorithms. For example, in some instances, the components in the memory 618 may be implemented as a neural network.

As described herein, an exemplary neural network passes input data through a series of connected layers to produce an output. Each layer in a neural network may also include another neural network, or may include any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 606 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 606 may include multiple instances of each of these or other types of sensors. For instance, the lidar sensors may include individual lidar sensors located at the corners, front, back, sides, and/or top of the vehicle 602. As another example, the camera sensors may include multiple cameras disposed at various locations about the exterior and/or interior of the vehicle 602. The sensor system(s) 606 may provide input to the vehicle computing device 604. Additionally, and/or alternatively, the sensor system(s) 606 may send sensor data, via the one or more networks 642, to the one or more computing device(s) 640 at a particular frequency, after a lapse of a predetermined period of time, in near real-time, etc.

The vehicle 602 may also include the one or more emitters 608 for emitting light and/or sound, as described above. The emitters 608 in this example include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may include acoustic beam steering technology.

The vehicle 602 may also include the one or more communication connection(s) 610 that enable communication between the vehicle 602 and one or more other local or remote computing device(s). For instance, the communication connection(s) 610 may facilitate communication with other local computing device(s) on the vehicle 602 and/or the drive system(s) 614. Also, the communication connection(s) 610 may allow the vehicle to communicate with other nearby computing device(s) (e.g., other nearby vehicles, traffic signals, etc.). The communication connection(s) 610 also enable the vehicle 602 to communicate with a remote teleoperations computing device or other remote services.

The communications connection(s) 610 may include physical and/or logical interfaces for connecting the vehicle computing device 604 to another computing device or a network, such as the network(s) 642. For example, the communications connection(s) 610 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 may include the one or more drive systems 614. In some examples, the vehicle 602 may have a single drive system 614. In at least one example, if the vehicle 602 has multiple drive systems 614, individual drive systems 614 may be positioned on opposite ends of the vehicle 602 (e.g., the front and the rear, etc.). In at least one example, the drive system(s) 614 may include one or more sensor systems to detect conditions of the drive system(s) 614 and/or the surroundings of the vehicle 602. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 614. In some cases, the sensor system(s) on the drive system(s) 614 may overlap or supplement corresponding systems of the vehicle 602 (e.g., sensor system(s) 606).

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 614. Furthermore, the drive system(s) 614 also include one or more communication connection(s) that enable communication by the respective drive module with one or more other local or remote computing device(s).

In at least one example, the localization component 620, perception component 622, and/or the planning component 624 may process sensor data, as described above, and may send their respective outputs, over the one or more network(s) 642, to the one or more computing device(s) 640. In at least one example, the localization component 620, the perception component 622, and/or the planning component 624 may send their respective outputs to the one or more computing device(s) 640 at a particular frequency, after a lapse of a predetermined period of time, in near real-time, etc.

The vehicle 602 may send sensor data to the one or more computing device(s) 640, via the network(s) 642. In some examples, the vehicle 602 may send raw sensor data to the computing device(s) 640. In other examples, the vehicle 602 may send processed sensor data and/or representations of sensor data to the computing device(s) 640. In some examples, the vehicle 602 may send sensor data to the computing device(s) 640 at a particular frequency, after a lapse of a predetermined period of time, in near real-time, etc. In some cases, the vehicle 602 may send sensor data (raw or processed) to the computing device(s) 640 as one or more log files. The computing device(s) 640 may receive the sensor data (raw or processed) and may generate and/or update maps based on the sensor data.

In examples, the vehicle 602 may generate various log file(s) representing sensor data captured by the vehicle 602. For example, a log file may include, but is not limited to, sensor data captured by one or more sensors of the vehicle 602 (e.g., lidar sensors, radar sensors, sonar sensors, wheel encoders, inertial measurement units (IMUs) (which may include gyroscopes, magnetometers, accelerometers, etc.), GPS sensors, image sensors, and the like), route information, localization information, and the like. In some cases, a log file(s) may include a log of all sensor data captured by the vehicle 602, decisions made by the vehicle 602, determinations made regarding segmentation and/or classification, and the like. A log files(s) may be sent to and received by the computing device(s) 640.

In at least one example, the computing device(s) 640 may include one or more processors 644 and memory 646 communicatively coupled with the one or more processors 644. In the illustrated example, the memory 646 stores a training component 648 that may train the machine learning models 636A-636C according to any of the techniques discussed herein. The training component 648 may train the machine learning models 636A-636C at any time, such as while offline, and then send the machine learning models 636A-636C to the vehicle 602 over the network(s) 642 to be implemented by the vehicle 602. In some cases, once trained, the machine learning models 636A-636C are deployed on the vehicle computing device 604, and operations of machine learning models 636A-636C are performed by the vehicle computing device 604. In some cases, once trained, the machine learning models 636A-636C are deployed on the computing device 640, operations of the machine learning models 636A-636C are performed by the computing device 640 to generate predictions, and then predictions are transmitted to the prediction component 650 of the vehicle computing device 604.

Although illustrated as being implemented on the computing device(s) 640, the training component 648 may be implemented on the vehicle 602, such as stored within the memory 618 of the vehicle computing device 604 and executed by the processor(s) 616 of the vehicle computing device 604. Further, any of the components of the vehicle computing device(s) 604 may alternatively, or additionally, be implemented by the computing device(s) 640.

The processor(s) 616 of the vehicle 602 and the processor(s) 644 of the computing device(s) 640 may be any suitable processor capable of executing instructions to process data and perform operations as described herein. By way of example and not limitation, the processor(s) 616 and 644 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 618 and memory 646 are examples of non-transitory computer-readable media. Memory 618 and memory 646 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 6 is illustrated as a distributed system, in alternative examples, components of the vehicle 602 may be associated with the computing device(s) 640 and/or components of the computing device(s) 640 may be associated with the vehicle 602. That is, the vehicle 602 may perform one or more of the functions associated with the computing device(s) 640, and vice versa.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples. For example, the components and instructions of FIG. 6 may utilize the processes and flows of FIGS. 1-5.

A non-limiting list of objects may include obstacles in an environment, including but not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, fect, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders and/or steps may be omitted. Additionally, various computations that are herein need not be performed in the order disclosed, and other examples using alternative orderings of the computations could be readily implemented. In addition to being reordered, the computations could also be decomposed into sub-computations with the same results.

EXAMPLE CLAUSES

While the example clauses described below are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

A: A system comprising: one or more processors; and one or more non-transitory computer-readable media storing computer-executable instructions that, when executed, cause the one or more processors to perform operations comprising: determining contextual data associated with an environment, the environment comprising an autonomous vehicle and an object at a first time; determining object state data representing the object at the first time; receiving image data representing the object at the first time; inputting the contextual data and the object state data to a first encoder machine learning model; receiving, from the first encoder machine learning model, a first encoded representation; inputting the image data and the first encoded representation to a second encoder machine learning model; receiving, from the second encoder machine learning model, a second encoded representation; inputting at least one of the first encoded representation or the second encoded representation to a decoder machine learning model; receiving, from the decoder machine learning model, a prediction associated with the object in the environment, wherein the decoder machine learning model is configured to output the prediction based on at least one of the first encoded representation or the second encoded representation; and controlling the autonomous vehicle based on the prediction.

B: The system of paragraph A, wherein the contextual data comprises a top-down representation of the environment.

C: The system of paragraph A or B, wherein the object state data comprises at least one of: a position of the object; an orientation of the object; or a size of the object.

D: The system of any of paragraphs A-C, wherein: the image data comprises a first image crop of an image of the environment that is captured at the first time, and the first image crop includes the object.

E: The system of any of paragraphs A-D, wherein: the first encoder machine learning model is trained at a first training time by backpropagating a first loss measure determined based on first ground-truth data to the decoder machine learning model and the first encoder machine learning model, and the second encoder machine learning model is trained at a second training time by backpropagating a second loss measure determined based on second ground-truth data to the decoder machine learning model and the second encoder machine learning model.

F: One or more non-transitory computer-readable media storing instructions executable by one or more processors, wherein the instructions, when executed, cause the one or more processors to perform operations comprising: receiving contextual data representing an environment that comprises a vehicle and an object; receiving image data representing the object; inputting the contextual data to a first encoder machine learning model; receiving, from the first encoder machine learning model, a first encoded representation; inputting the image data and the first encoded representation to a second encoder machine learning model; receiving, from the second encoder machine learning model, a second encoded representation; determining, based at least in part on the second encoded representation, a prediction associated with the environment; and controlling the vehicle based on the prediction.

G: The one or more non-transitory computer-readable media of paragraph F, wherein: the contextual data and the image data are associated with a first time, input data for the first encoder machine learning model further comprise object state data associated with the object, and the object state data represents the object at the first time.

H: The one or more non-transitory computer-readable media of paragraph G, wherein the object state data comprises at least one of: a position of the object; an orientation of the object; or a size of the object.

I: The one or more non-transitory computer-readable media of paragraph G or H, wherein determining the object state data comprises: inputting sensor data of the environment to a perception machine learning model; and receiving, from the perception machine learning model, the object state data.

J: The one or more non-transitory computer-readable media of any of paragraphs G-I, wherein: the object state data is determined based on at least one of the image data, lidar data, or radar data, and the image data is generated by an image sensor of the vehicle.

K: The one or more non-transitory computer-readable media of any of paragraphs F-J, wherein: the image data comprises a feature vector generated by a perception machine learning model, and the contextual data is determined based on the feature vector.

L: The one or more non-transitory computer-readable media of any of paragraphs F-K, where: the object is captured by a plurality of image sensors, and the image data is determined based on sensor data of an image sensor that is determined from the plurality of image sensors based on a heuristic.

M: The one or more non-transitory computer-readable media of any of paragraphs F-L, wherein: the prediction is determined by a decoder machine learning model, the first encoder machine learning model is trained at a first training time by backpropagating a first loss measure determined based on first ground-truth data to the decoder machine learning model and the first encoder machine learning model, and the second encoder machine learning model is trained at a second training time by backpropagating a second loss measure determined based on second ground-truth data to the decoder machine learning model and the second encoder machine learning model.

N: The one or more non-transitory computer-readable media of any of paragraphs F-M, wherein the contextual data comprises at least one of: a top-down representation of the environment; or a vectorized representation of the environment.

O: A method comprising: receiving contextual data representing an environment that comprises a vehicle and an object; receiving image data representing the object; inputting the contextual data to a first encoder machine learning model; receiving, from the first encoder machine learning model, a first encoded representation; inputting the image data and the first encoded representation to a second encoder machine learning model; receiving, from the second encoder machine learning model, a second encoded representation; determining, based at least in part on the second encoded representation, a prediction associated with the environment; and controlling the vehicle based on the prediction.

P: The method of paragraph O, wherein: the contextual data and the image data are associated with a first time, input data for the first encoder machine learning model further comprise object state data associated with the object, and the object state data represents the object at the first time.

Q: The method of paragraph P, wherein the object state data comprises at least one of: a position of the object; an orientation of the object; or a size of the object.

R: The method of paragraph P or Q, wherein determining the object state data comprises: inputting sensor data of the environment to a perception machine learning model; and receiving, from the perception machine learning model, the object state data.

S: The method of any of paragraphs O-R, wherein the contextual data comprises at least one of: a top-down representation of the environment; or a vectorized representation of the environment.

T: The method of any of paragraphs O-S, wherein: the prediction is determined by a decoder machine learning model, the first encoder machine learning model is trained at a first training time by backpropagating a first loss measure determined based on first ground-truth data to the decoder machine learning model and the first encoder machine learning model, and the second encoder machine learning model is trained at a second training time by backpropagating a second loss measure determined based on second ground-truth data to the decoder machine learning model and the second encoder machine learning model.

The invention claimed is:

1. A system comprising:
one or more processors; and
one or more non-transitory computer-readable media storing computer-executable instructions that, when executed, cause the one or more processors to perform operations comprising:
determining contextual data associated with an environment, the environment comprising an autonomous vehicle and an object at a first time, wherein the contextual data comprises at least one of: a top-down representation of the environment; or a vectorized representation of the environment;
determining object state data representing the object at the first time;
receiving image data representing the object at the first time;
inputting the contextual data and the object state data to a first encoder machine learning model;
receiving, from the first encoder machine learning model, a first encoded representation;
inputting the image data and the first encoded representation to a second encoder machine learning model;
receiving, from the second encoder machine learning model, a second encoded representation;
inputting at least one of the first encoded representation or the second encoded representation to a decoder machine learning model;
receiving, from the decoder machine learning model, a prediction associated with the object in the environment, wherein the decoder machine learning model is configured to output the prediction based on at least one of the first encoded representation or the second encoded representation; and controlling the autonomous vehicle based on the prediction.

2. The system of claim 1, wherein the contextual data comprises a top-down representation of the environment.

3. The system of claim 1, wherein the object state data comprises at least one of:
a position of the object;
an orientation of the object; or
a size of the object.

4. The system of claim 1, wherein:
the image data comprises a first image crop of an image of the environment that is captured at the first time, and
the first image crop includes the object.

5. The system of claim 1, wherein:
the first encoder machine learning model is trained at a first training time by backpropagating a first loss measure determined based on first ground-truth data to the decoder machine learning model and the first encoder machine learning model, and
the second encoder machine learning model is trained at a second training time by backpropagating a second loss measure determined based on second ground-truth data to the decoder machine learning model and the second encoder machine learning model.

6. One or more non-transitory computer-readable media storing instructions executable by one or more processors, wherein the instructions, when executed, cause the one or more processors to perform operations comprising:
receiving contextual data representing an environment that comprises a vehicle and an object, wherein the contextual data comprises at least one of: a top-down representation of the environment; or a vectorized representation of the environment;
receiving image data representing the object;
inputting the contextual data to a first encoder machine learning model;
receiving, from the first encoder machine learning model, a first encoded representation;
inputting the image data and the first encoded representation to a second encoder machine learning model;
receiving, from the second encoder machine learning model, a second encoded representation;
determining, based at least in part on the second encoded representation, a prediction associated with the environment; and
controlling the vehicle based on the prediction.

7. The one or more non-transitory computer-readable media of claim 6, wherein:
the contextual data and the image data are associated with a first time,
input data for the first encoder machine learning model further comprise object state data associated with the object, and
the object state data represents the object at the first time.

8. The one or more non-transitory computer-readable media of claim 7, wherein the object state data comprises at least one of:
a position of the object;
an orientation of the object; or
a size of the object.

9. The one or more non-transitory computer-readable media of claim 7, wherein determining the object state data comprises:
inputting sensor data of the environment to a perception machine learning model; and receiving, from the perception machine learning model, the object state data.

10. The one or more non-transitory computer-readable media of claim 7, wherein:
the object state data is determined based on at least one of the image data, lidar data, or radar data, and
the image data is generated by an image sensor of the vehicle.

11. The one or more non-transitory computer-readable media of claim 6, wherein:
the image data comprises a feature vector generated by a perception machine learning model, and
the contextual data is determined based on the feature vector.

12. The one or more non-transitory computer-readable media of claim 6, where:
the object is captured by a plurality of image sensors, and
the image data is determined based on sensor data of an image sensor that is determined from the plurality of image sensors based on a heuristic.

13. The one or more non-transitory computer-readable media of claim 6, wherein:
the prediction is determined by a decoder machine learning model,
the first encoder machine learning model is trained at a first training time by backpropagating a first loss measure determined based on first ground-truth data to the decoder machine learning model and the first encoder machine learning model, and
the second encoder machine learning model is trained at a second training time by backpropagating a second loss measure determined based on second ground-truth data to the decoder machine learning model and the second encoder machine learning model.

14. A method comprising:
receiving contextual data representing an environment that comprises a vehicle and an object, wherein the contextual data comprises at least one of: a top-down representation of the environment; or a vectorized representation of the environment;
receiving image data representing the object;
inputting the contextual data to a first encoder machine learning model;
receiving, from the first encoder machine learning model, a first encoded representation;
inputting the image data and the first encoded representation to a second encoder machine learning model;
receiving, from the second encoder machine learning model, a second encoded representation;
determining, based at least in part on the second encoded representation, a prediction associated with the environment; and
controlling the vehicle based on the prediction.

15. The method of claim 14, wherein:
the contextual data and the image data are associated with a first time,
input data for the first encoder machine learning model further comprise object state data associated with the object, and
the object state data represents the object at the first time.

16. The method of claim 15, wherein the object state data comprises at least one of:
a position of the object;
an orientation of the object; or
a size of the object.

17. The method of claim 15, wherein determining the object state data comprises:

inputting sensor data of the environment to a perception machine learning model; and receiving, from the perception machine learning model, the object state data.

18. The method of claim 14, wherein:

the prediction is determined by a decoder machine learning model, the first encoder machine learning model is trained at a first training time by backpropagating a first loss measure determined based on first ground-truth data to the decoder machine learning model and the first encoder machine learning model, and the second encoder machine learning model is trained at a second training time by backpropagating a second loss measure determined based on second ground-truth data to the decoder machine learning model and the second encoder machine learning model.

* * * * *